No. 859,579. PATENTED JULY 9, 1907.
R. H. READ.
ARC LIGHT ELECTRODE.
APPLICATION FILED MAY 18, 1901. RENEWED JUNE 15, 1907.
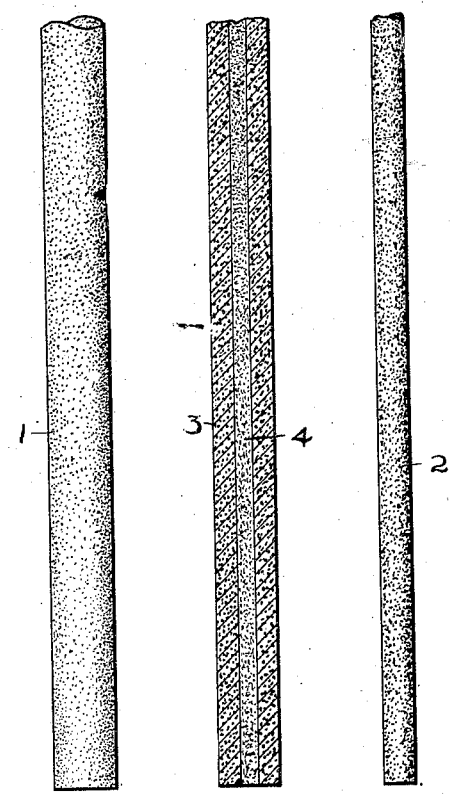
Witnesses
Erving R. Gurney
Benjamin B. Hull.
Inventor
Robert H. Read.
by Albert G. Davis
Atty.

UNITED STATES PATENT OFFICE.

ROBERT H. READ, OF SCHENECTADY, NEW YORK, ASSIGNOR TO GENERAL ELECTRIC COMPANY, A CORPORATION OF NEW YORK.

ARC-LIGHT ELECTRODE.

No. 859,579.     Specification of Letters Patent.     Patented July 9, 1907.

Application filed May 18, 1901. Renewed June 15, 1907. Serial No. 379,112.

*To all whom it may concern:*

Be it known that I, ROBERT H. READ, a citizen of the United States, residing at Schenectady, county of Schenectady, State of New York, have invented certain new and useful Improvements in Arc-Light Electrodes, of which the following is a specification.

This invention relates to arc lighting, the object being to improve the quality of the light and permit the maintenance of a longer arc with currents of moderate potential and amperage.

I have discovered that conducting electrodes for arc lamps formed of the conducting carbids or containing a considerable portion of the same, permit a much longer arc to be drawn with the same potential and current than corresponding electrodes of carbon. The action of the arc is also much smoother than a carbon arc, being remarkably quiet, the tendency of the tips at the arc terminals being to fuse slightly before being vaporized, thus conducing toward a quiet action free from hissing or decrepitation and much more stable than a carbon arc. The color of the light varies with the base of the carbid, for example, an arc containing carbid of calcium has a rich golden color of intense luminosity, whereas, one formed of or containing aluminium carbid has a much whiter appearance, the spectrum varying with the nature of the carbid.

I prefer to employ carbids which are unaffected by moisture and therefore do not deteriorate in service when exposed to the atmosphere. For example, carbid of calcium is unsatisfactory for practical service unless mixed with a conducting bond or compound which protects each particle of the carbid from access of moisture. Whereas, aluminium carbid which is unaffected by moisture at ordinary temperatures does not require such protection. The present application covers the latter form of the invention, claims for conducting carbids in general, as well as for such carbids as are affected by moisture or require protection against the same, being made in a companion application which is a division hereof, filed Oct. 25, 1902, Serial No. 128,786. Claims for other special carbids are made in other divisional cases, as titanium carbid; see application Serial No. 126,669, filed Oct. 10, 1902.

Where carbids of lithium, calcium, strontium, barium, lanthanum, yttrium, thorium and manganese, or generally, any carbid which is attackable by cold water is employed, the electrode should be formed of a mixture of ground carbid mixed with coal-tar, or similar carbonaceous binder baked and raised to incandescence out of contact with air, and then paraffined or similarly protected on the outside from moisture; or such compounds may be employed as a core for a hollow carbon. If cored electrodes are employed care should be observed to protect the core from access of moisture by coating the carbon with paraffin or metal or other moisture-proof material, as the affinity of such carbids as are decomposed by cold water is so strong that moisture is absorbed through the pores of the carbon and soon splits the electrode along its axis. Much more satisfactory results may, however, be secured by the carbids of aluminium, chromium, zirconium, molybdenum, titanium, wolfram, which are not attacked by water at ordinary temperatures or at least very slightly so. I find that carbid of aluminium gives excellent results either when employed pure or when mixed with a carbonizable binder, molded, and baked; and by reason of its cheapness and ease of manufacture is most feasible for ordinary uses. It may also be used for a core for a cored carbon. In preparing the electrodes, the material as produced in the electric furnace is finely pulverized and molded in sticks of the desired size by mixing with it about 5% of a carbonizable binder such as cane sugar or wheat flour, moistened with a small quantity of coal-tar or even cold water. After drying and baking at a bright red heat, its structure may be rendered more compact and dense by filling the pores with carbon by any approved process such for example as saturating with sugar and again firing or by raising to a red heat in a hydro-carbon vapor. When burning in an automatic lamp it is desirable to provide for a slight lateral or scraping motion in drawing the arc to rub away the deposit of oxid liable to form at the tips of the electrodes which is a good non-conductor of electricity. The lateral movement rubs off the thin film of oxid and gives a conductive connection which permits the arc to be struck, after which it is maintained with more stability than an arc between simple carbon electrodes. A proportional admixture of the carbids with carbon also improves the nature of the light and the stability of the arc.

I find that a comparatively long arc may be maintained with much smaller current when the electrodes are composed of or contain the conducting carbids as above described. The vapor acts as a better conductor and seems to form a thicker arc with the same current than carbon, and the material when cold is a sufficiently good conductor to act as a carrier of current. When used with an inclosing globe, the lamp in which the electrodes are used should be provided with a wiper for periodically removing the deposit from the walls of the globe or this may be effected by providing a draft through the inclosing globe; the latter expedient however, greatly reduces the life of the electrodes and increases the expense of maintenance. I find that with electrodes of carbid of calcium or carbid of aluminium, for example, a good arc from ¼ to ⅜ inches in length may be maintained by a current of one ampere with a drop across the arc of 50 volts, thus giving an energy consumption of 50 watts per unit of light, and yielding a brilliant, steady and uniform light.

In the accompanying drawings, Figures 1 and 2 illustrate elevations of arc light pencils of different sizes formed according to my invention. Fig. 3 shows a cored electrode. They may consist of sawed sticks of a crystalline carbid or may be composed of a carbonized compound of the carbid and the carbonaceous material as above set forth; 1 representing an electrode suitable for a 5 ampere lamp and 2 one suitable for a one ampere lamp. 3 represents a hollow carbon pencil and 4 a core of conducting carbid compound as above described.

Novel features of my invention disclosed but not claimed herein are claimed in the following applications filed by me as divisions of the present application, to wit—applications, Serial #126,669, arc light. Serial #128,786, arc light electrode. Serial #262,757, arc light electrode.

What I claim as new and desire to secure by Letters Patent of the United States, is,

1. An arc-light electrode containing a conducting carbid insensitive to moisture.
2. An arc-light electrode containing carbid of aluminium.
3. An arc-light electrode composed of finely-divided aluminium carbid united by a carbonaceous binder.
4. An arc light electrode composed principally of a conducting carbid insensitive to moisture.

In witness whereof I have hereunto set my hand this 16th day of May, 1901.

ROBERT H. READ.

Witnesses:
BENJAMIN B. HULL,
MARGARET E. WOOLLEY.